(12) United States Patent
Tse

(10) Patent No.: US 6,428,690 B1
(45) Date of Patent: Aug. 6, 2002

(54) FILTER MODULE WITH IMPROVED BACKWASH CAPABILITY

(76) Inventor: Tom Tse, 803 S. White Rd., San Jose, CA (US) 95127

( * ) Notice: Subject to any disclaimer, the term of this patent is extended or adjusted under 35 U.S.C. 154(b) by 0 days.

(21) Appl. No.: 09/661,013

(22) Filed: Sep. 13, 2000

(51) Int. Cl.$^7$ ................................................ B01D 29/68
(52) U.S. Cl. ...................... 210/136; 210/275; 210/279; 210/411
(58) Field of Search ................................. 210/136, 169, 210/275, 277, 279, 289, 291, 151, 411, 416.2, 617, 793, 150

(56) References Cited

U.S. PATENT DOCUMENTS

| | | | | |
|---|---|---|---|---|
| 2,769,547 A | * | 11/1956 | Hirsch | |
| 4,379,050 A | * | 4/1983 | Hess et al. | ................... 210/279 |
| 4,865,734 A | * | 9/1989 | Schulz | ........................ 210/279 |
| 4,885,083 A | * | 12/1989 | Banks | ......................... 210/277 |
| 5,126,042 A | * | 6/1992 | Malone | |
| 5,445,740 A | * | 8/1995 | Malone | ...................... 210/793 |
| 5,573,663 A | * | 11/1996 | Junius et al. | |
| 5,723,043 A | * | 3/1998 | Hawk et al. | ................. 210/275 |
| 5,932,092 A | * | 8/1999 | Hawk et al. | ................. 210/277 |
| 6,238,556 B1 | * | 5/2001 | Hawk et al. | ................. 210/275 |

* cited by examiner

Primary Examiner—Joseph W. Drodge
(74) Attorney, Agent, or Firm—The Kline Law Firm

(57) ABSTRACT

A filtering system with an improved backwashing capability includes influent and effluent means, and uses plastic beads as the filtering medium. The system further includes a plurality of backwash jets that eject water under pressure at angles such that the force of the water contacting the filter beads breaks apart the beads. Separating the filter beads allows the backwash operation to provide a far more thorough cleaning of the filter tank. This leads to improved performance of the filter and extended life of the filter media.

6 Claims, 6 Drawing Sheets

FILTER MODULE WITH IMPROVED BACKWASH CAPABILITY

FIELD OF THE INVENTION

The present invention relates generally to filtering systems, and more particularly is a filter module with an improved backwashing method.

BACKGROUND OF THE INVENTION

In any scenario in which large amounts of water are utilized, a filtering system is necessary. Such scenarios include swimming and wading pools, fountains, fish tanks and ponds, and other aquaculture applications. The present invention was developed specifically for fish tanks and ponds, but is clearly applicable in any application requiring high volume filtering.

Most filtering systems utilize a filter tank with a filtering medium suspended in an interior of the tank. The filtering medium must be formed from a particulate material so that water can flow through the medium. Some media commonly used for filtering are diatomaceous earth, sand, gravel, and plastic pellets. The filter media remove contaminants from the water by trapping the contaminating material on the individual particles of the filter medium. After the filter system has operated for some time, there is clearly the danger of the filter being clogged by the trapped contaminants. Therefore a method of cleaning the filtering medium is required.

The method most commonly used for cleaning the filter medium in a filter tank is backwashing. Backwashing typically involves simply reversing the direction of water flow through the interior of the filter tank so that the trapped particulate matter is washed back out of the tank. One of the chief drawbacks of backwashing is that when the filter medium gets dirty, the particulate elements tend to clump together so that backwashing does not effectively remove the contaminants. This problem is recognized and addressed in the prior art.

One prior art method of attacking the aggregation of the filter media is by including a mechanical means of agitation in the tank. Two references that disclose such a scheme are the "Floating Media Biofilter" patents of Malone, U.S. Pat. No. 5,126,042, issued Jun. 30, 1992; and U.S. Pat. No. 5,445,740, issued Aug. 29, 1995. The devices disclosed in these references include an electric motor mounted on top of the filter tank. A vaned shaft passing through the interior of the tank rotates to stir the media.

Another method disclosed in the prior art entails an auger passing through the interior of the tank that continuously displaces the particles of the filter medium. This method is disclosed in "Fluid Filter Using Floating Media" by Junius et al., U.S. Pat. No. 5,573,663, issued Nov. 12, 1996.

Accordingly, it is an object of the present invention to provide a filtering system with an improved backwashing capability.

It is a further object of the present invention to provide a means of directing water flow in the backwash operation such that the water flow breaks up clumps of particulate media.

SUMMARY OF THE INVENTION

The present invention is a filtering system with an improved backwashing capability. The system has fairly typical influent and effluent means, and uses plastic beads as the filtering medium, as do many other systems. However, the system of the present invention further includes a plurality of backwash jets that eject water under pressure at angles such that the force of the water contacting the filter beads breaks apart the beads. Separating the filter beads allows the backwash operation to provide a far more thorough cleaning of the filter tank. This leads to improved performance of the filter and extended life of the filter media.

An advantage of the present invention is that the backwash water itself serves as a means to separate the individual filter media.

Another advantage of the present invention is that no external mechanical means is required for the media separation.

A still further advantage of the present invention is that the system is simple and inexpensive to manufacture.

These and other objects and advantages of the present invention will become apparent to those skilled in the art in view of the description of the best presently known mode of carrying out the invention as described herein and as illustrated in the drawings.

DETAILED DESCRIPTION OF THE INVENTION

Figure 1:
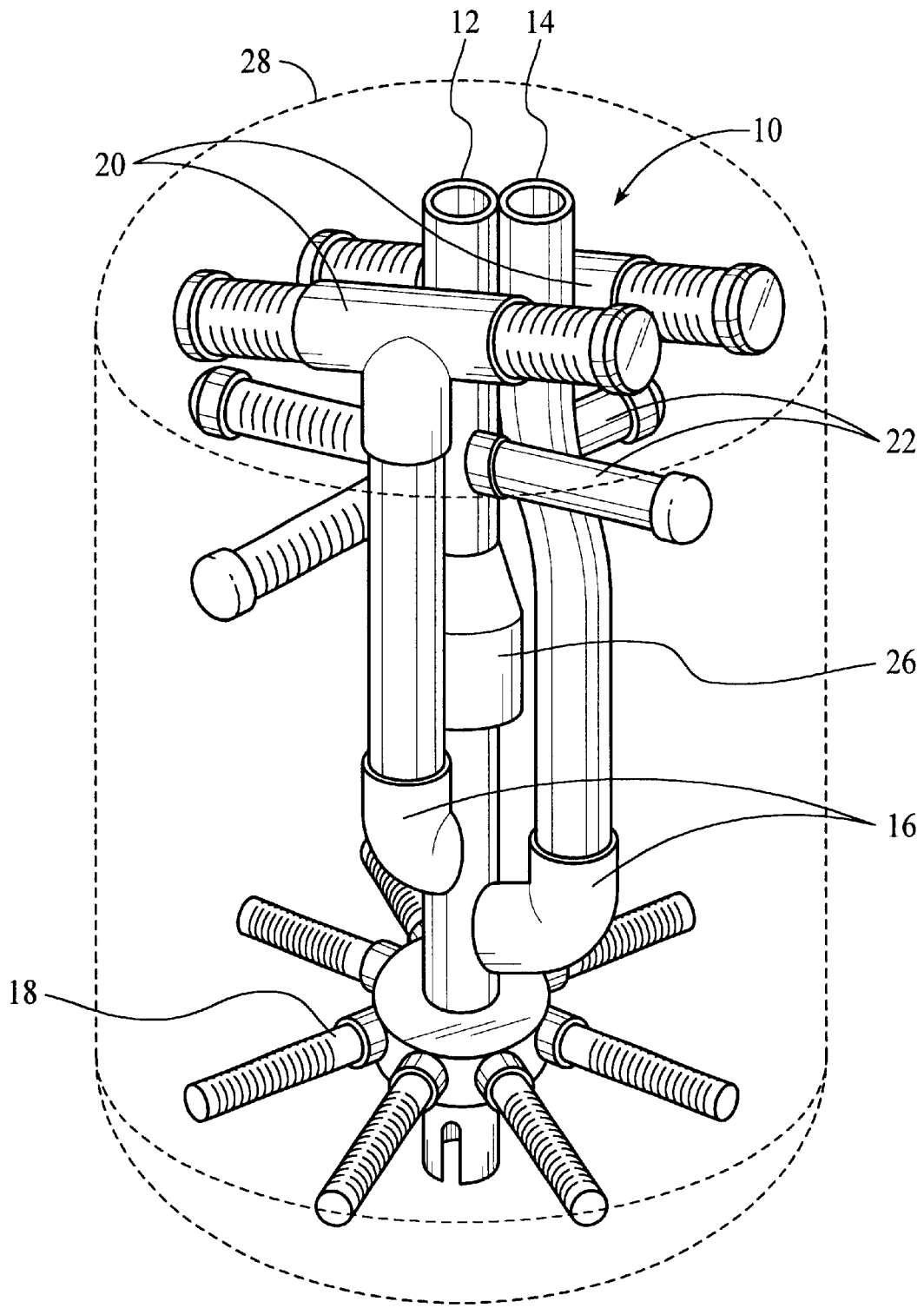
FIG. 1 is a perspective view of the filtering system of the present invention installed in a filter tank.
Figure 2:
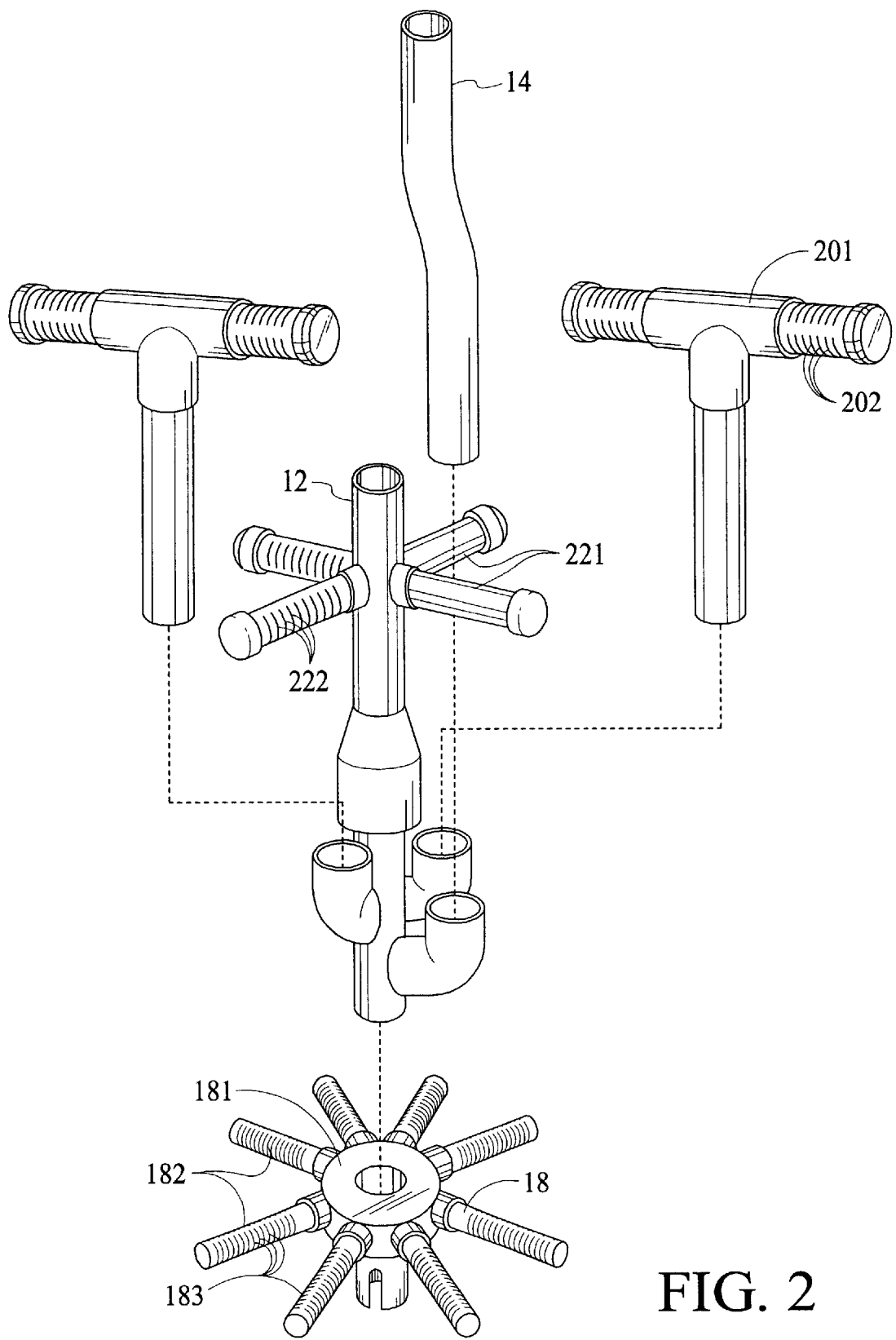
FIG. 2 is an exploded view of the filtering components.

The present invention is a filter module 10 with an improved backwashing capability. With reference first to FIGS. 1 and 2, the filter module 10 comprises chiefly a first upright flow pipe 12 and a second upright flow pipe 14. The flow pipes 12 and 14 form the main waterway of the filtering system, and are in communication with each other through a first joint 16. An influent pipe assembly 18 is situated near a lower end of the module 10. Two effluent pipes 20 are affixed to the first upright flow pipe 12 through second and third joints 16. A backwash jet assembly 22 is situated near a top end of the first flow pipe 12. A waste drain port is situated at a lower end of the first flow pipe 12. A check valve 26 is installed midway in the first flow pipe 12.

The influent pipe assembly 18 comprises a central hub 181 connected to the first flow pipe 12. A plurality of lateral influent pipes 182 project outward from the central hub 181. The influent pipes 182 comprise multiple influent ports 183 to allow water to flow from the flow pipe 12 into the filter tank 28. The influent pipe assembly 18 serves to spread the water flow into the tank 28 from a single concentrated point, flow pipe 12, to a widely dispersed area across the bottom of the filter tank 28.

In the preferred embodiment, two effluent pipes 20 are T-shaped, and are connected to the first flow pipe 12 through joints 16. The cross members 201 of the T-shaped effluent pipes 20 are situated near the top of the filter tank 28 for efficient collection of water. The effluent pipes 20 comprise a plurality of effluent ports 202 which take in water during the filtering operation.

The backwash jet assembly 22 projects outward from the first flow pipe 12. The backwash jet assembly 22 comprises a plurality of lateral backwash pipes 221, each of which includes multiple backwash jets 222. The structure of the backwash jets 222 is critical to the operation of the filter module 10. The backwash jets 222 are situated so that water is expelled downward at an angle. In the preferred embodiment, the angle relative to vertical of the center line of the water flow path leaving the backwash jets 222 is 45°. The backwash jets 222 are small enough and few enough in number so that the water is expelled at a high velocity. In the preferred embodiment, slots are simply machined into the pipes 221 to form the jets 222.

Figure 3:
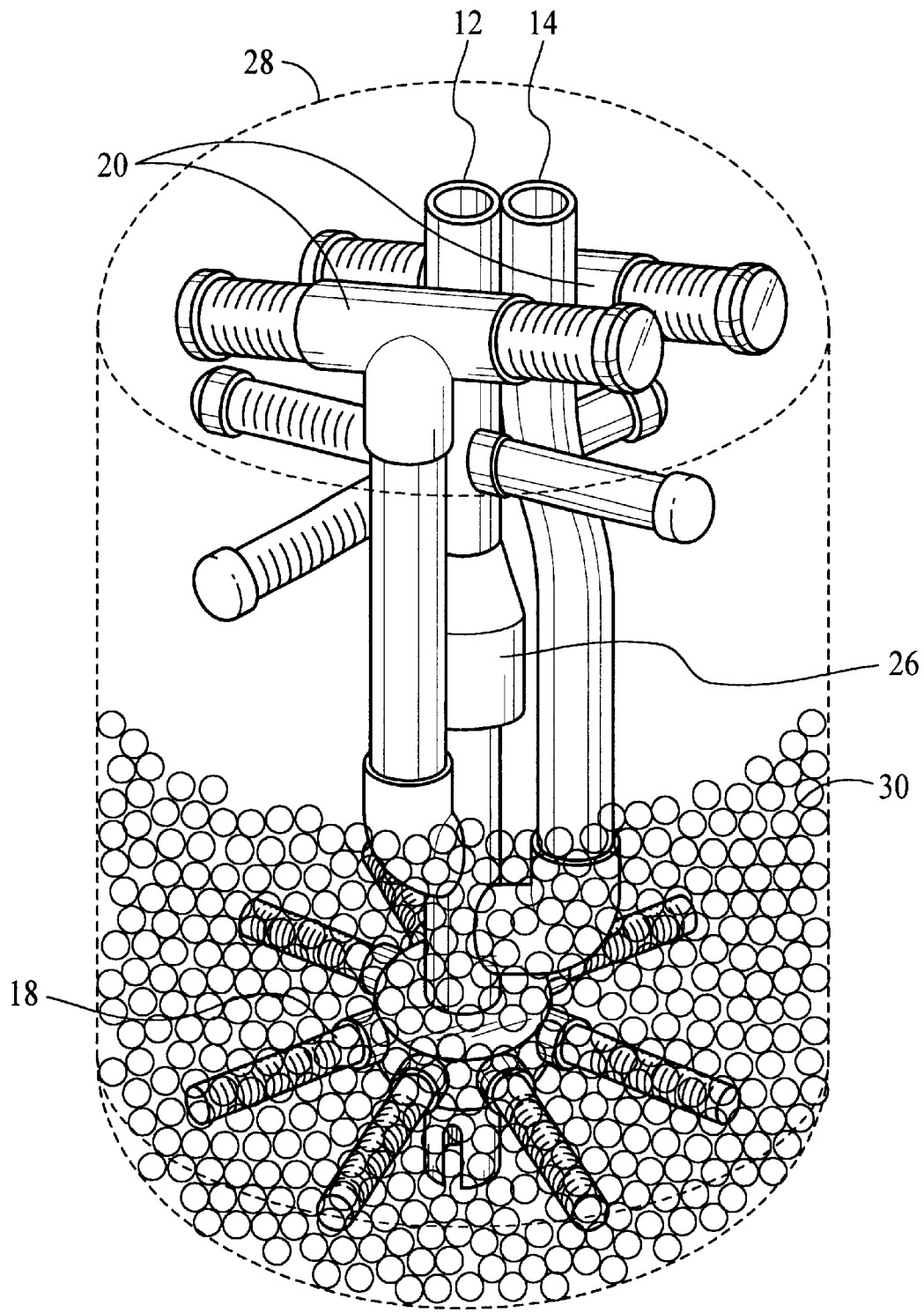
FIG. 3 shows the system in a tank with filter media added, before the system is activated.

Referring now to FIG. 3, before the filter system is activated, the filter tank 28 is partially filled with filter media 30. In the preferred embodiment, the filter media 30 are plastic beads. Typically, approximately two-thirds of the filter tank 28 is filled with the filter media 30.

Figure 4:
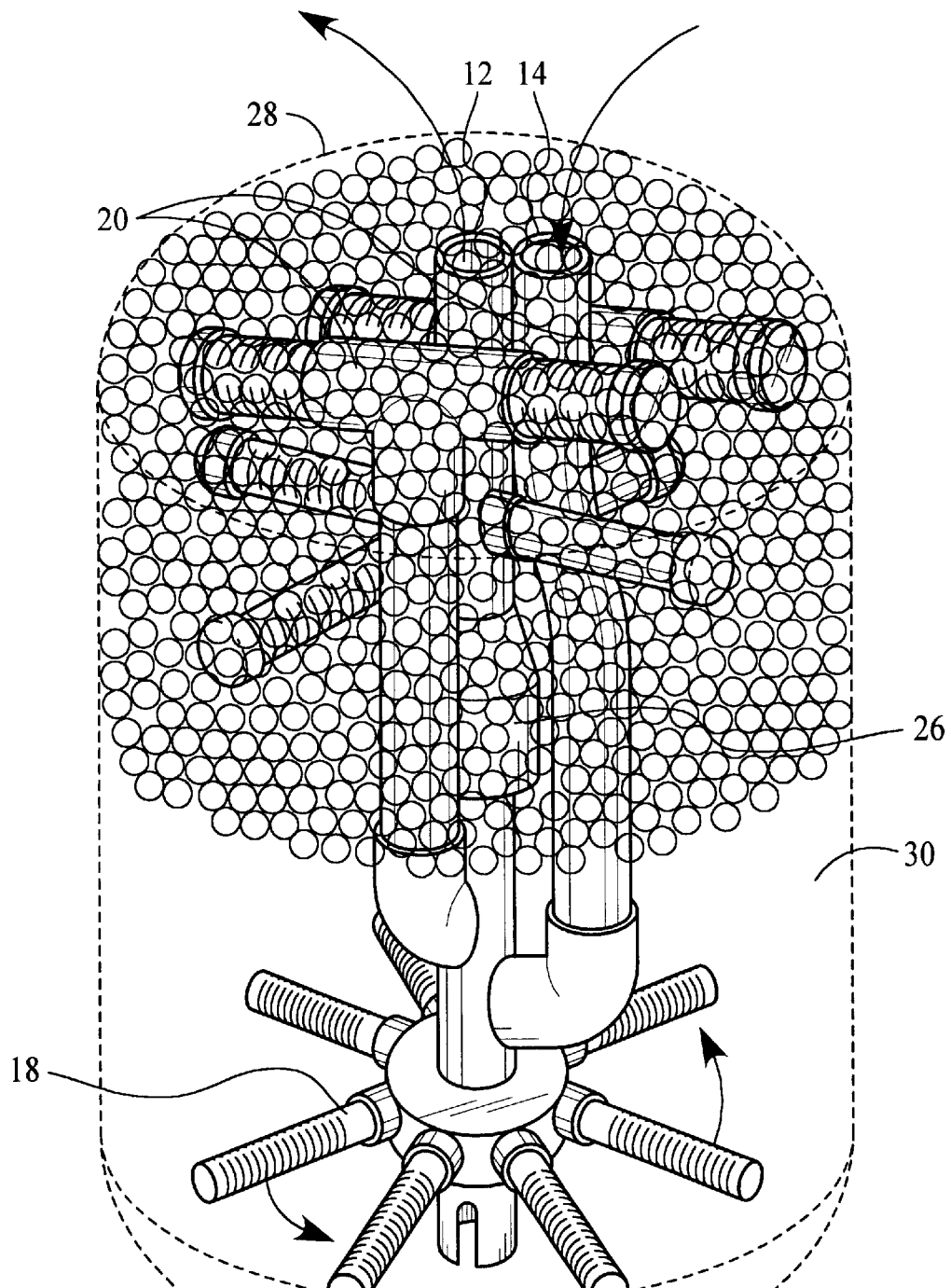
FIG. 4 illustrates the tank after the system has been activated.

FIG. 4 illustrates the situation in the tank 28 when the filtering system is first activated. Water flows into the tank 28 through the second flow pipe 14. The water flows downward to the influent pipe assembly 18. The direction of the water flow is ensured by the check valve 26. Water flows through the central hub 181 into the lateral influent pipes 182 and out into the filter tank 28 through the influent ports 183. As the water fills the tank 28, the filter media 30 float toward the top of the tank 28.

When the tank 28 is filled, water is drawn in through the effluent ports 202 in the effluent pipes 201. The water is then pumped out of the tank 28 through the first flow pipe 12, and returns to the pump reservoir.

Figure 5:
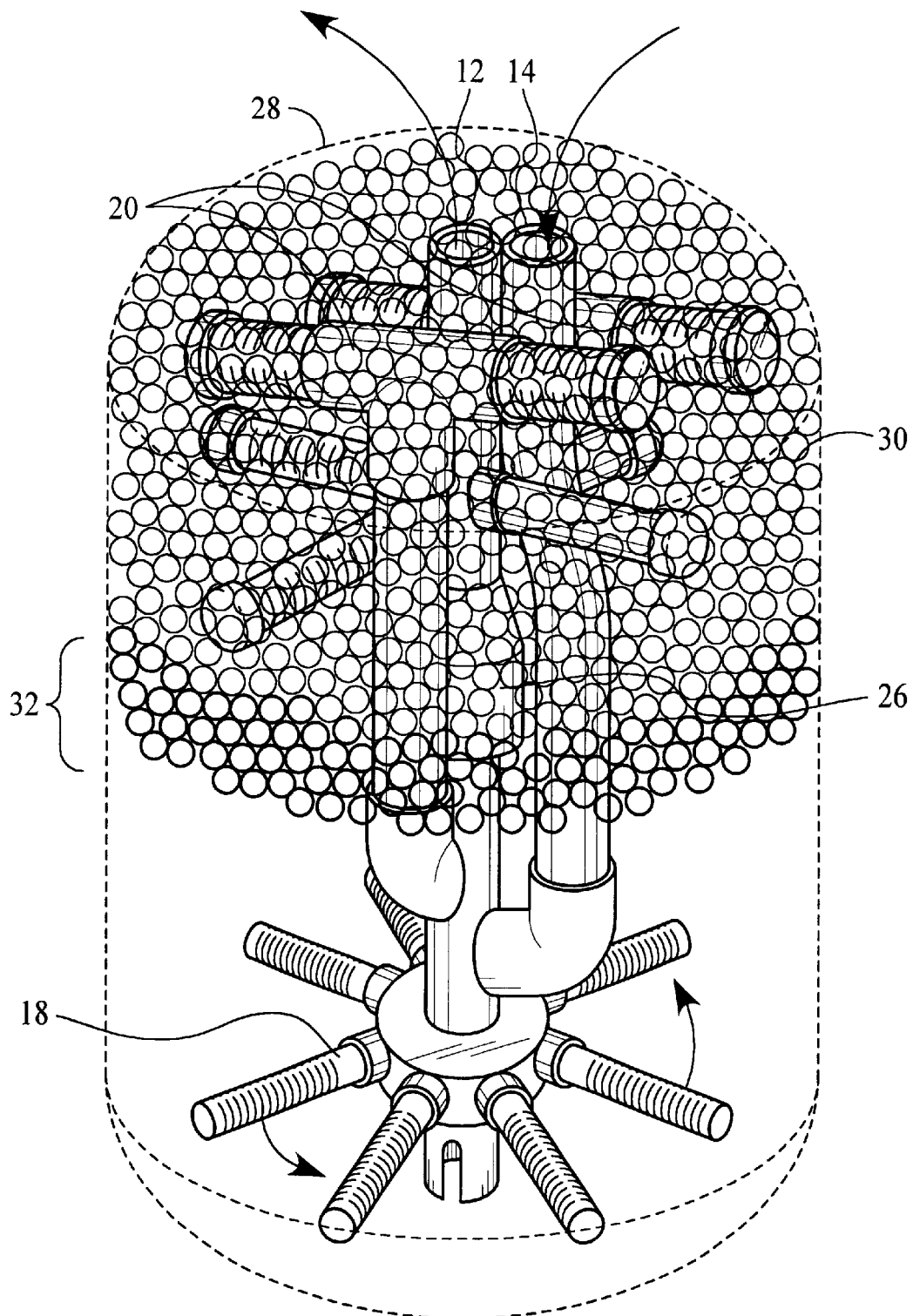
FIG. 5 shows the condition of the tank after waste has begun to accumulate on the filter media.

As the filtering system operates, waste matter 32 naturally accumulates first on the lowermost filter media 30 as shown in FIG. 5. Eventually, if the filter is not cleaned, the accumulated waste 32 will clog the filter so that it can not function properly.

Figure 6:
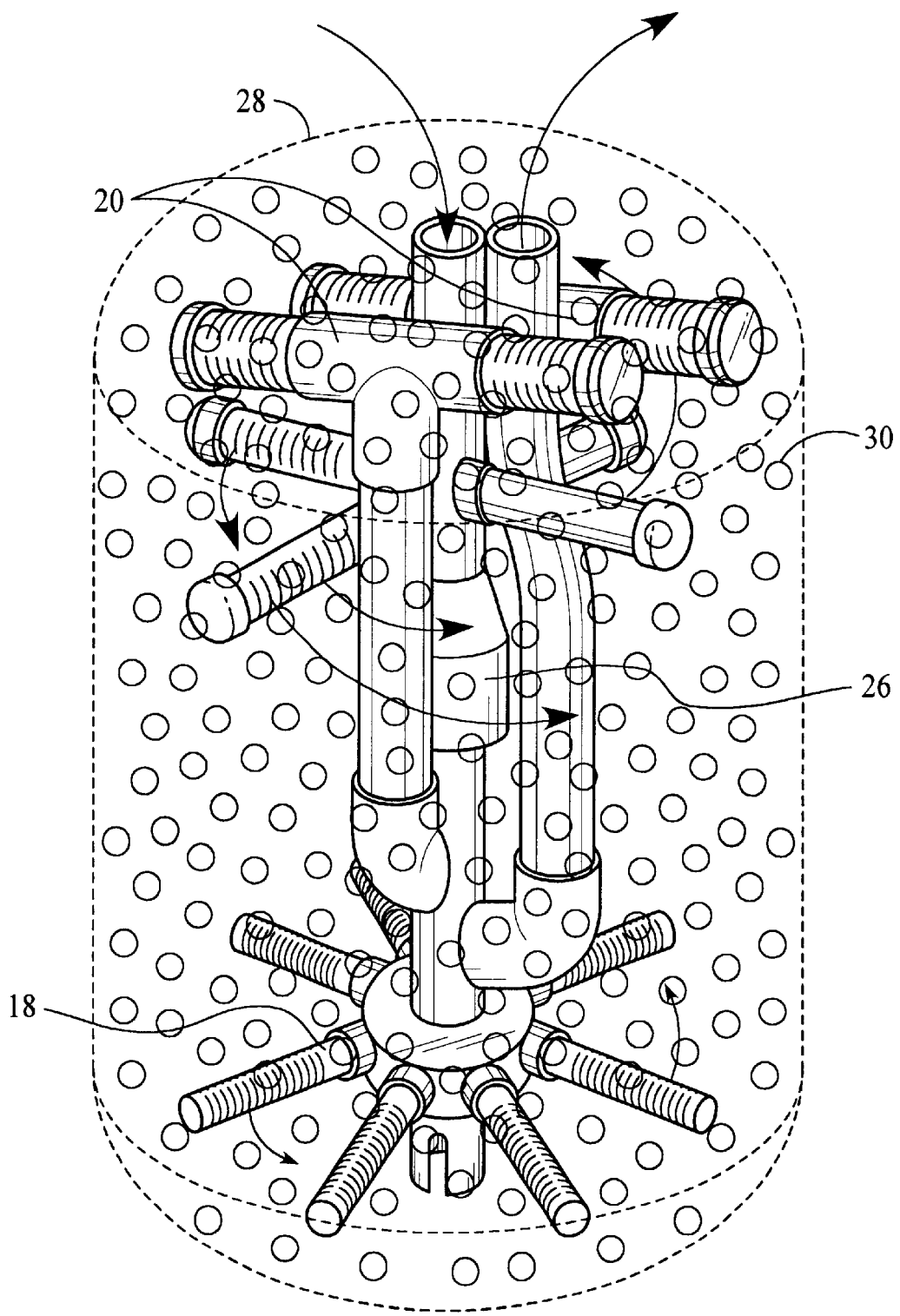
FIG. 6 depicts the interior of the tank during the backwashing operation.

For this reason, the filter system is equipped with an improved backwash capability. FIG. 6 shows the system during the backwashing operation. Water flow is reversed so that water flows into the tank through the first flow pipe 12 into the backwash jet assembly 22. The water flows out through the backwash pipes 221. As the water exits the backwash jets 222, the flow area is significantly reduced. The reduction in flow area accelerates the water so that it is under pressure as it exits the jets 222. The pressurized flow impinges on the accumulated filter media 30, breaking the media 30 apart so that the water flow can effectively remove the waste material 32 from the filter media 30 as the water flows around the individual beads.

During the backwash operation, the water flow is now toward the bottom of the tank. The waste 32 removed from the filter media 30 accumulates at the bottom of the tank 28. Because the water flow has been reversed, water is drawn through the waste port into the lower end of the first flow pipe 12. Again, the direction of the water flow is ensured by the presence of the check valve 26. The waste water is then directed upward through the second flow pipe 14. The waste water is then pumped out of the system through a waste outlet as it exits the filter tank 28, thereby completing the cleaning process.

The above disclosure is not intended as limiting. Those skilled in the art will readily observe that numerous modifications and alterations of the device may be made while retaining the teachings of the invention. Accordingly, the above disclosure should be construed as limited only by the restrictions of the appended claims.

I claim:

1. A filter module comprising:

a first flow pipe, a second flow pipe in communication with a joint, a water influent means in communication with said second flow pipe, a water effluent means in communication with said first flow pipe, a filtering medium, a filter tank, a check valve, and a backwash jet assembly connected to said first flow pipe including a plurality of backwash jets; the module being constructed and arranged, during a filtering mode, water flows into said filter tank through said second flow pipe and is dispersed into said filter tank through said water influent means, the water then passing through said filtering medium contained in said filter tank, the water then being drawn into said water effluent means and then out of said filter tank through said first flow pipe, a direction of water flow being ensured by said check valve; and wherein during a backwashing mode, the direction of water flow is reversed so that water flows into said filter tank through said first flow pipe, then into said backwash jet assembly, the water exiting said backwash jet assembly at increased velocity through said plurality of backwash jets, the water then impinging on accumulated particles of said filtering medium, thereby breaking the particles apart so that waste material is removed from said particles of said filtering medium, waste water containing the waste material then being drawn into a lower end of said first flow pipe, said check valve causing said waste water to flow through said joint into said second flow pipe, the waste water then flowing out of said filter tank through said second flow pipe and being eliminated from said filter tank.

2. The filter module of claim 1 wherein:

said water influent means comprises a central hub connected to said first flow pipe, a plurality of lateral influent pipes project outward from said central hub, and said lateral influent pipes comprise multiple influent ports.

3. The filter module of claim 1 wherein:

said effluent means comprises two T-shaped effluent pipes, said effluent pipes being connected to said first flow pipe through joints, cross members of said effluent pipes being situated near a top of said filter tank, and said effluent pipes comprising a plurality of effluent ports.

4. The filter module of claim 1 wherein:

said backwash jet assembly projects outward from said first flow pipe, said backwash jet assembly comprises a plurality of lateral backwash pipes, each of said lateral backwash pipes comprising multiple backwash jets, said backwash jets on a given one of said lateral backwash pipes having a total cross sectional area less than that of said given one of said lateral backwash pipes such that a velocity of water flowing through said lateral backwash pipes is increased as the water passes through said backwash jets.

5. The filter module of claim 4 wherein:

said backwash jets eject water at a downward angle of 45° relative to vertical.

6. The filter module of claim 4 wherein:

said backwash jets are slots machined into said lateral backwash pipes.

* * * * *